(12) United States Patent
Mo et al.

(10) Patent No.: US 11,745,629 B2
(45) Date of Patent: Sep. 5, 2023

(54) CHILD SAFETY SEAT

(71) Applicant: Bambino Prezioso Switzerland AG, Steinhausen (CH)

(72) Inventors: Xiao Long Mo, Dongguan (CN); Da Liang Zhang, Dongguan (CN); Zheng-Wen Guo, Dongguan (CN); Ying-Zhong Chen, Dongguan (CN)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 0 days.

(21) Appl. No.: 17/198,758

(22) Filed: Mar. 11, 2021

(65) Prior Publication Data
US 2021/0284049 A1 Sep. 16, 2021

(30) Foreign Application Priority Data
Mar. 13, 2020 (CN) .......................... 202010177261.6

(51) Int. Cl.
*B60N 2/28* (2006.01)
(52) U.S. Cl.
CPC ......... *B60N 2/2884* (2013.01); *B60N 2/2872* (2013.01)
(58) Field of Classification Search
CPC ........................... B60N 2/2884; B60N 2/2872
See application file for complete search history.

(56) References Cited

U.S. PATENT DOCUMENTS

| 7,246,854 | B2 * | 7/2007 | Dingman | B60N 2/2881 |
| | | | | 297/484 |
| 8,684,456 | B2 | 4/2014 | Powell | |
| 9,475,411 | B2 | 10/2016 | Gagnade | |
| 9,610,868 | B2 | 4/2017 | Zhang | |
| 9,908,444 | B2 * | 3/2018 | Haas | B60N 2/2866 |
| 10,414,297 | B2 * | 9/2019 | Pos | B60N 2/2872 |
| RE47,971 | E * | 5/2020 | Tanner | B60N 2/2884 |

(Continued)

FOREIGN PATENT DOCUMENTS

| CN | 206914178 U | 1/2018 |
| CN | 110271464 A | 9/2019 |

(Continued)

OTHER PUBLICATIONS

Gebhardt, DE-102015113836-A1, Feb. 23, 2017, Translation attached to foreign patent document, p. 5-6 (Year: 2017).*

(Continued)

*Primary Examiner* — David R Dunn
*Assistant Examiner* — Tania Abraham
(74) *Attorney, Agent, or Firm* — CANTOR COLBURN LLP

(57) ABSTRACT

A child safety seat includes a seat shell and a buffering part. The seat shell includes a backrest portion and two sidewalls, the backrest portion having a front surface facing forward that is suitable to provide support for a child's back, the two sidewalls being respectively disposed at a left and a right side of the seat shell for restricting sideways movements of a child who sits in the seat shell, one of the two sidewalls having a sidewall portion located in front of the front surface. The buffering part is connected with the seat shell, the buffering part being operable to protrude sideways at an outer side of the sidewall portion.

6 Claims, 5 Drawing Sheets

(56) References Cited

U.S. PATENT DOCUMENTS

| | | | |
|---|---|---|---|
| 10,857,968 B2 * | 12/2020 | Chen | B60N 2/2881 |
| 10,994,689 B2 * | 5/2021 | Chi | B60R 21/16 |
| 2010/0171349 A1 | 7/2010 | Dellanno | |
| 2011/0252566 A1 * | 10/2011 | Rumack | B60N 2/4263 4/573.1 |
| 2012/0007408 A1 | 1/2012 | Freienstein et al. | |
| 2017/0151894 A1 | 6/2017 | McRoberts et al. | |
| 2020/0384900 A1 * | 12/2020 | Thurn | B60N 2/42709 |

FOREIGN PATENT DOCUMENTS

| | | | | |
|---|---|---|---|---|
| DE | 202015104791 U1 | 11/2015 | | |
| DE | 102015214910 A1 | 2/2016 | | |
| DE | 102015113836 A1 * | 2/2017 | | B60N 2/2851 |
| DE | 102015113836 A1 | 2/2017 | | |
| EP | 1452406 A1 | 9/2004 | | |
| EP | 2275303 A1 | 1/2011 | | |
| GB | 2531121 A | 4/2016 | | |
| GB | 2555914 A | 5/2018 | | |
| JP | H07117542 A | 5/1995 | | |
| WO | 2018/109177 A1 | 6/2018 | | |

OTHER PUBLICATIONS

EESR of the corresponding EP Patent Application No. 21162332.7 dated Apr. 12, 2012.

The official communication with the observations by a third party in corresponding European patent application No. 21162332.7 dated Apr. 13, 2022.

Wikipedia regarding a definition on Deflection (engineering) accessed on May 4, 2022.

Chinese Office Action for Chinese Application No. 202010177261. 6; Report dated Jun. 3, 2023; pp. 1-18 with Machine Translation.

* cited by examiner

CHILD SAFETY SEAT

CROSS-REFERENCE TO RELATED APPLICATION(S)

This application claims priority to Chinese patent application no. 202010177261.6 filed on Mar. 13, 2020.

BACKGROUND

1. Field of the Invention

The present invention relates to child safety seats.

2. Description of the Related Art

A child safety seat is typically used in an automobile vehicle to properly restrain a child in the event of accidental collision. When the vehicle is subjected to a front or a rear collision, the child safety seat can typically provide protection by restricting forward or rearward displacement of the child. In addition to the protection for front and rear collisions, some existing child safety seats may further have side impact protection structures for dissipating side collision energy. However, the traditional side impact protection structures may generate undesirable deformations in the sidewalls of the child safety seat during side collision, which may be adverse to the intended protective function.

Therefore, there is a need for an improved child safety seat that can provide better protection and address at least the foregoing issues.

SUMMARY

The present application describes a child safety seat that can provide better side protection for a child.

According to an embodiment, the child safety seat includes a seat shell and a buffering part. The seat shell includes a backrest portion and two sidewalls, the backrest portion having a front surface facing forward that is suitable to provide support for a child's back, the two sidewalls being respectively disposed at a left and a right side of the seat shell for restricting sideways movements of a child who sits in the seat shell, one of the two sidewalls having a sidewall portion located in front of the front surface. The buffering part is connected with the seat shell, the buffering part being operable to protrude sideways at an outer side of the sidewall portion.

DETAILED DESCRIPTION OF THE EMBODIMENTS

Figure 1:
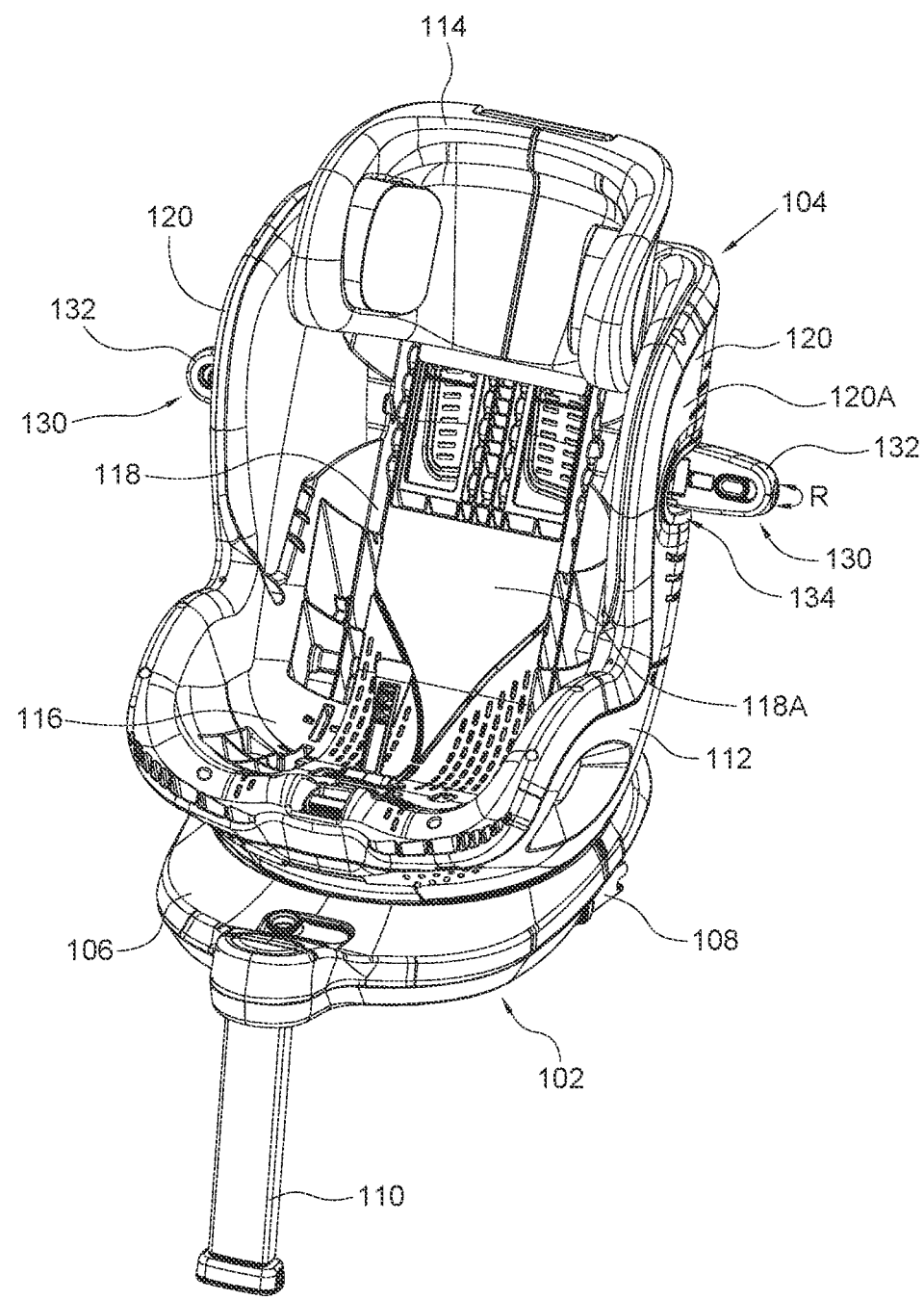
FIG. 1 is a perspective view illustrating an embodiment of a child safety seat.
Figure 2:
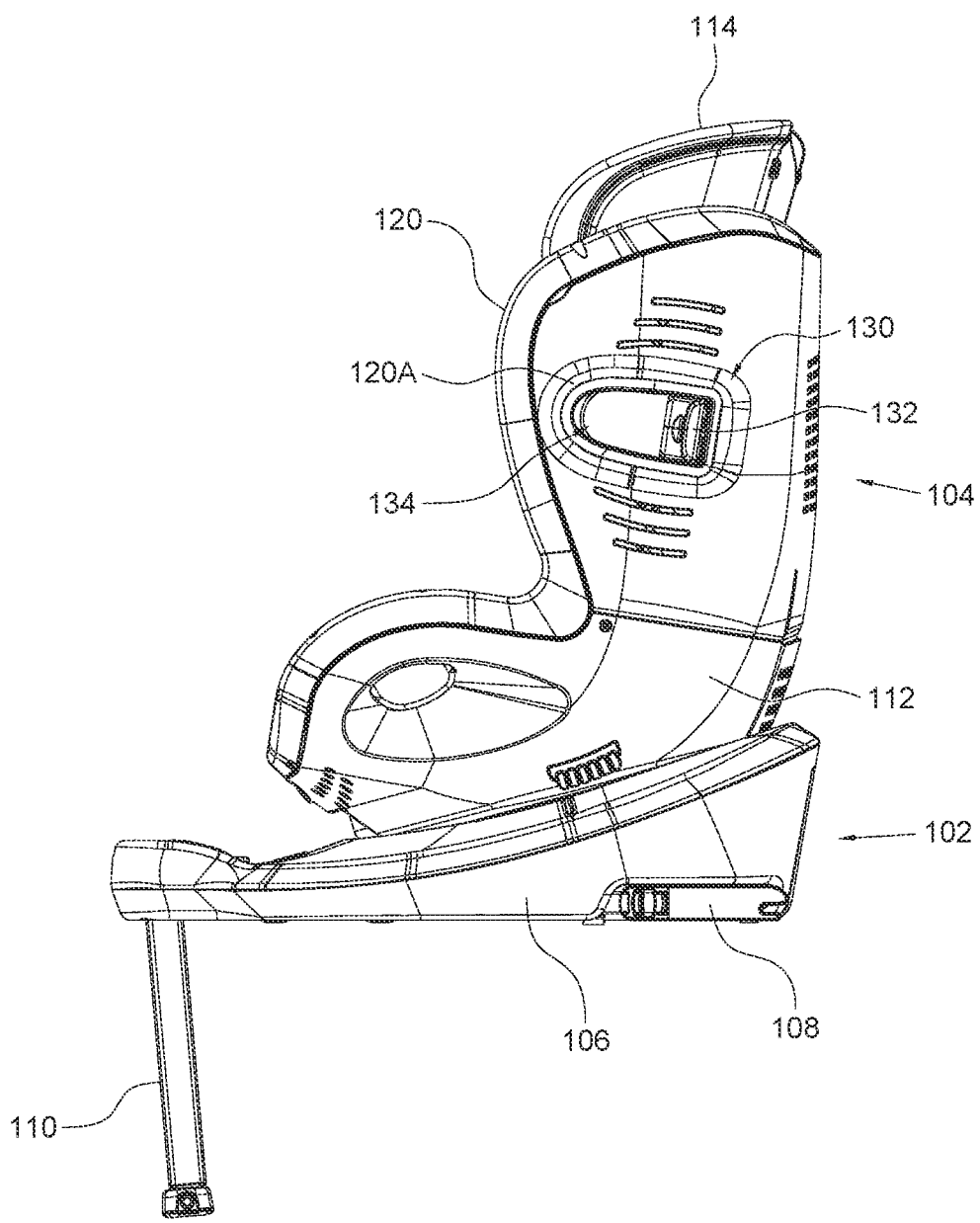
FIG. 2 is a side view of the child safety seat.
Figure 3:
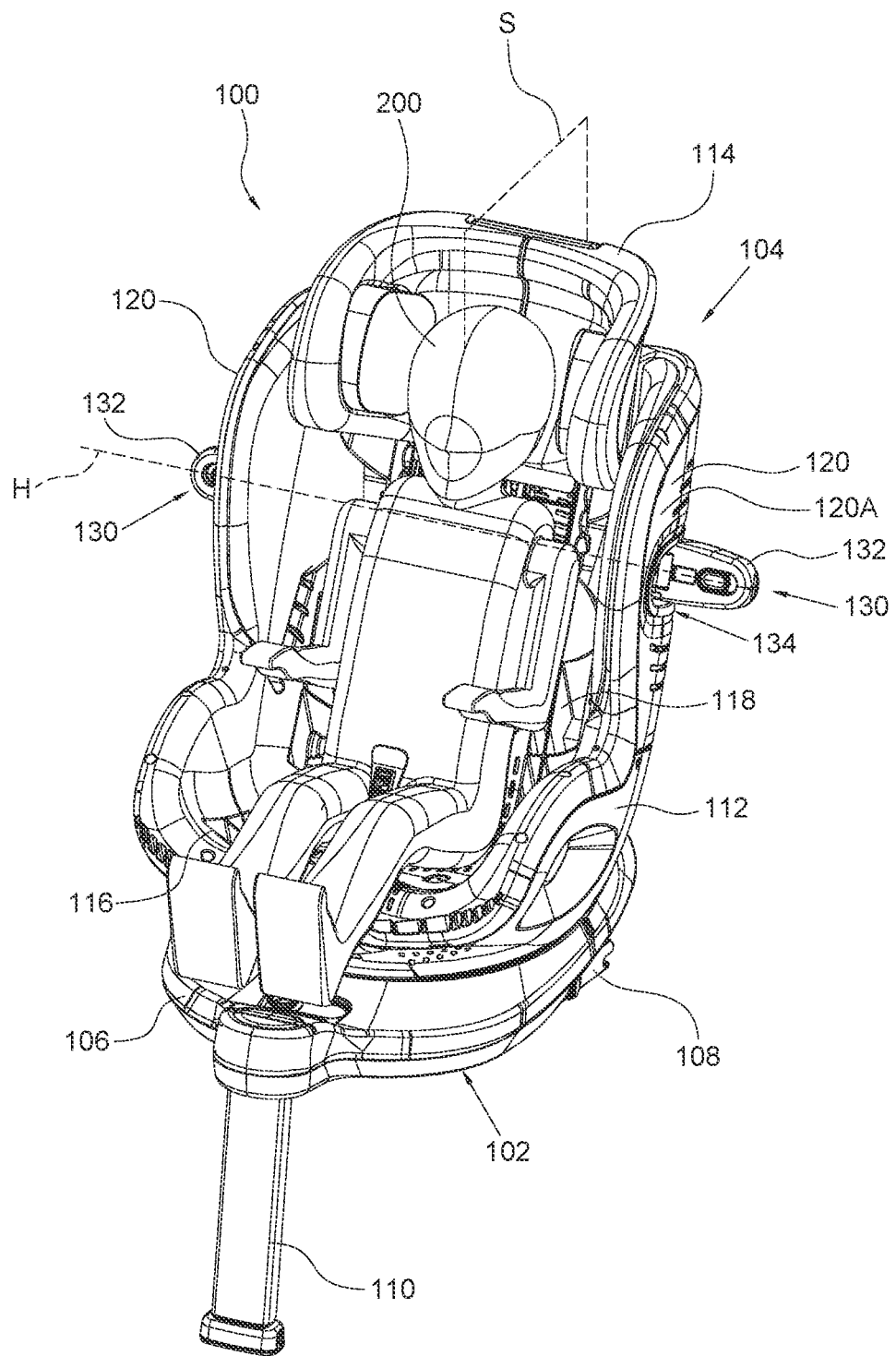
FIG. 3 is a perspective view illustrating a child sitting in the child safety seat.
Figure 4:
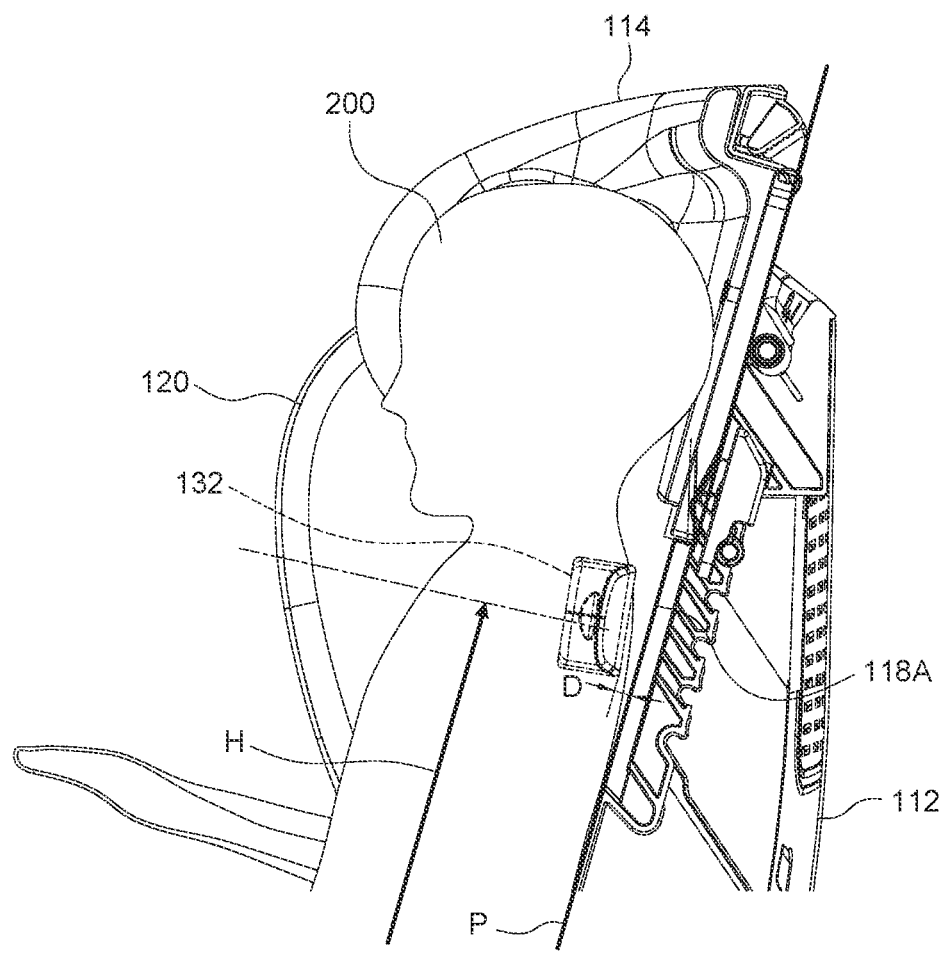
FIG. 4 is a partial cross-sectional view taken along a vertical plane S shown in FIG. 3.

FIGS. 1 and 2 are respectively a perspective view and a side view illustrating an embodiment of a child safety seat 100, FIG. 3 is a perspective view illustrating a child 200 sitting in the child safety seat 100, and FIG. 4 is a partial cross-sectional view taken along a vertical plane S shown in FIG. 3. Referring to FIGS. 1-4, the child safety seat 100 includes a support base 102, and a child seat 104 disposed on the support base 102. The support base 102 is adapted to be installed on a vehicle seat, and can provide stable support for the child safety seat 100. According to an example of construction, the support base 102 can include a shell body 106, two latch devices 108 and a support leg 110. The two latch devices 108 can be assembled with the shell body 106, and can be respectively disposed at a left and a right side of the shell body 106 adjacent to an end thereof. The support leg 110 can be connected with the shell body 106 at an end thereof opposite to the end where are provided the latch devices 108, and can extend downward from a bottom of the shell body 106. When the support base 102 is installed on a vehicle seat, the two latch devices 108 can be positioned adjacent to a seatback of the vehicle seat and can releasably engage with an anchor structure (e.g., ISOFIX anchor) provided in the vehicle to lock the support base 102 in place on the vehicle seat. Moreover, the support leg 110 can contact against a floor of the vehicle in front of the vehicle seat, which can prevent flipping of the child safety seat 100.

Referring to FIGS. 1-3, the child seat 104 can include a seat shell 112, a headrest 114 and two side impact protection modules 130. The seat shell 112 can be disposed on the support base 102, and includes a seat portion 116, a backrest portion 118 and two sidewalls 120. According to an example of construction, the seat shell 112 including the seat portion 116, the backrest portion 118 and the two sidewalls 120 can be made of rigid materials, which may include, without limitation, rigid plastics. The seat portion 116, the backrest portion 118 and the two sidewalls 120 of the seat shell 112 can at least partially delimit a receiving space suitable for seating a child. The headrest 114 is slidably connected with the seat shell 112 for upward and downward sliding along the backrest portion 118. The backrest portion 118 can have a front surface 118A facing forward that is suitable to provide support for a child's back. The two sidewalls 120 respectively protrude forward at a left and a right side of the seat shell 112, and extend from a top of the backrest portion 118 to the seat portion 116. Accordingly, the two sidewalls 120 can restrict sideways movements of a child 200 who sits in the seat shell 112.

Referring to FIGS. 1-4, the two side impact protection modules 130 can be similar in construction, and can include two buffering parts 132 respectively connected with the seat shell 112. More specifically, each sidewall 120 can have a sidewall portion 120A located in front of the front surface 118A of the backrest portion 118, and the two buffering parts 132 can be respectively connected with the two sidewall portions 120A. In this manner, each buffering part 132 is operable to protrude sideways at an outer side of the sidewall portion 120A.

According to an example of construction, the buffering part 132 is movably connected with the sidewall portion 120A for movement between a first and a second position, wherein the first position corresponds to a stowed state where the buffering part 132 is retracted toward the sidewall portion 120A, and the second position corresponds to a deployed position where the buffering part 132 protrudes sideways from the sidewall portion 120A. For example, the buffering part 132 is pivotally connected with the sidewall portion 120A for rotation between the first and second position, as shown with arrow R in FIG. 1. According to an example of construction, the sidewall portion 120A can have an opening 134, and the buffering part 132 can be retracted into the opening 134 in the first position.

When the vehicle is subjected to sideways collision, the buffering part 132 protruding sideways from the sidewall portion 120A can hit an interior side panel of the vehicle (e.g., a vehicle door) and consequently generate a deformation for dissipating a portion of the impact energy. In particular, it has been observed that when the sidewall portion 120A where is connected the buffering part 132 is located in front of the front surface 118A of the backrest portion 118, the buffering part 132 can urge the sidewall portion 120A to bend toward the interior of the seat shell 112 during sideways collision, which can provide better protection for a child. Referring to FIGS. 3 and 4, assuming that a vertical plane S is substantially equidistant to the two sidewalls 120 and perpendicularly intersects the front surface 118A of the backrest portion 118, a smallest distance D (better shown in FIG. 4) between the front surface 118A and an image of the buffering part 132 projected on the vertical plane S can be between about 1 mm and about 200 mm. According to another example of construction, the smallest distance D is between about 5 mm and about 170 mm. According to yet another example of construction, the smallest distance D is between about 10 mm and about 140 mm. According to still another example of construction, the smallest distance D is between about 15 mm and about 100 mm. For example, assuming that the front surface 118A intersects the vertical plane S along a longitudinal axis P (i.e., the longitudinal axis P is substantially equidistant to the two sidewalls 120), an image of the buffering part 132 projected on the vertical plane S would be located in front of the front surface 118A and would not traverse the longitudinal axis P, and the smallest distance D can be defined between the longitudinal axis P and the image of the buffering part 132 projected on the vertical plane S.

Figure 5:
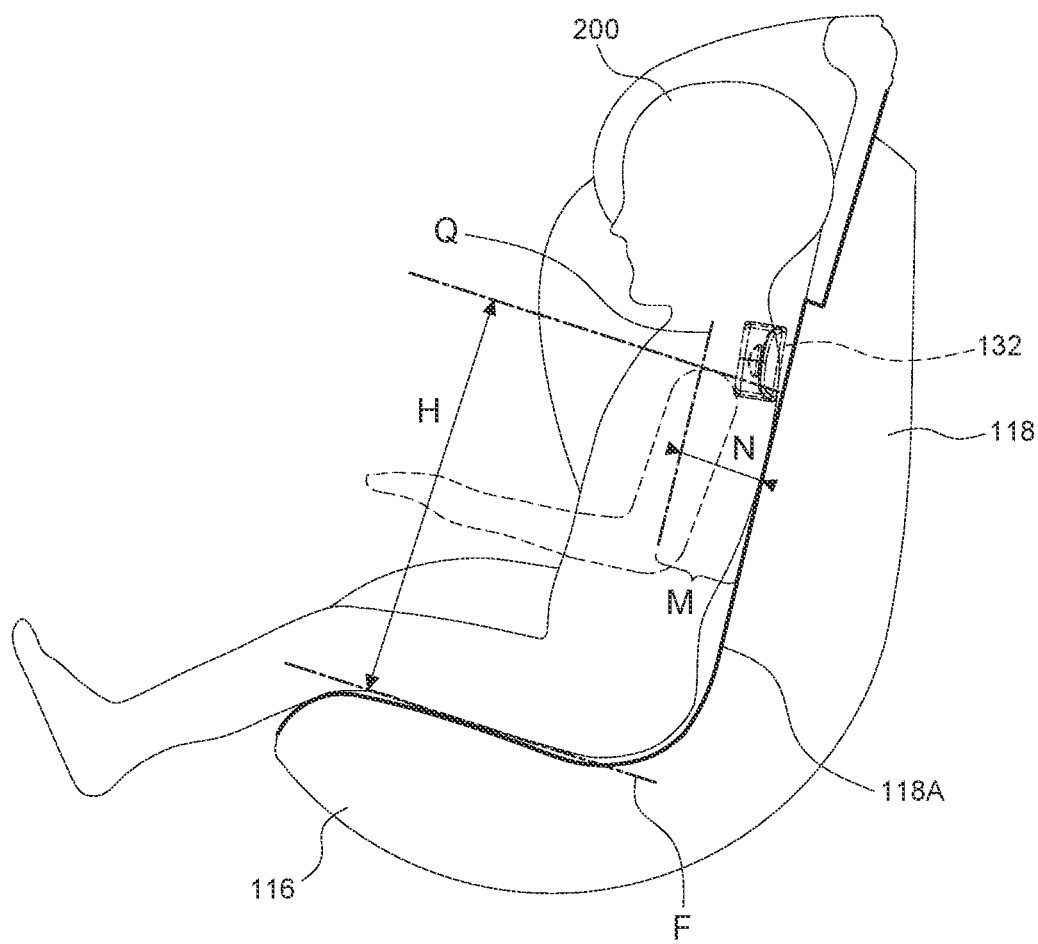
FIG. 5 is another partial cross-sectional view taken along the vertical plane S shown in FIG. 3.

In conjunction with FIGS. 3 and 4, FIG. 5 is another partial cross-sectional view taken along the vertical plane S shown in FIG. 3. Referring to FIGS. 3-5, the buffering part 132 can be located adjacent to a shoulder height H of a child 200 sitting in the child safety seat 100. The shoulder height H may be defined as the height of the child's shoulder relative to a seat plane F of the seat portion 116 that generally corresponds to a support surface of the child safety seat 100 on which the child 200 sits. According to an example of construction, the buffering part 132 is located adjacent to a shoulder height H that is between about 280 mm and about 370 mm. Moreover, an image of the buffering part 132 projected on the vertical plane S can be located within a region M extending between the front surface 118A of the backrest portion 118 and a shoulder plane Q of the child 200 sitting in the seat shell 112. The shoulder plane Q is substantially parallel to the front surface 118A of the backrest portion 118 and intersects the shoulders of the child 200. According to an example of construction, a distance N taken in the vertical plane S between the front surface 118A of the backrest portion 118 and the shoulder plane Q is between 0 and about 75 mm.

According to an example of construction, the sidewall portion 120A where is connected the buffering part 132 is located in front of the front surface 118A of the backrest portion 118 and adjacent to the shoulder height H of a child sitting in the seat shell 112. The buffering part 132 can be disposed on the sidewall portion 120A adjacently to the shoulder height H and within a region between the front surface 118A of the backrest portion 118 and the shoulder plane Q of the child 200. For example, the buffering part 132 may be disposed on the sidewall portion 120A at a height from the seat plane F that is between about 280 mm and about 370 mm, and in a region that extends forward within about 75 mm from the front surface 118A of the backrest portion 118. Moreover, the buffering part 132 may be disposed so that a smallest distance D between the front surface 118A and an image of the buffering part 132 projected on the vertical plane S can be within any of the aforementioned ranges. During sideways collision, the buffering part 132 can urge the sidewall portion 120A to bend inward, more particularly toward the interior of the seat shell 112 in the region adjacent to the child's shoulder, which can provide effective protection for the child.

Advantages of the child safety seat described herein include the ability to provide better protection for a child during sideways collision, whereby the child safety seat can be safer in use.

Realization of the child safety seat has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
   a seat shell including a backrest portion and two sidewalls, the backrest portion having a front surface facing forward that is suitable to provide support for a child's back, and the two sidewalls being respectively disposed at a left and a right side of the seat shell for restricting sideways movements of a child who sits in the seat shell, at least one of the two sidewalls having a sidewall portion located in front of the front surface; and
   a buffering part connected with the sidewall portion, the buffering part being operable to protrude sideways at an outer side of the sidewall portion, wherein the buffering part is entirely located in front of a plane of the front surface and a smallest distance between the buffering part and the plane of the front surface is between about 15 mm and about 100 mm, wherein the buffering part is positioned on the sidewall portion such that during a sideways collision the buffering part urges the sidewall portion to bend inwardly.

2. The child safety seat according to claim 1, wherein the buffering part is movably connected with the sidewall portion for movement between a first and a second position, the buffering part being retracted toward the sidewall portion in the first position and protruding sideways at an outer side of the sidewall portion in the second position.

3. The child safety seat according to claim 2, wherein the buffering part is pivotally connected with the sidewall portion.

4. The child safety seat according to claim 1, wherein the buffering part is disposed adjacent to a shoulder height of a child sitting in the seat shell.

5. The child safety seat according to claim 1, wherein the buffering part is disposed on the sidewall portion at a height from a seat plane that is between about 280 mm and about 370 mm, the seat plane generally corresponding to a support surface of the child safety seat on which a child sits.

6. The child safety seat according to claim 1, wherein the buffering part is disposed on the sidewall portion in a region that extends forward within about 75 mm from the front surface of the backrest portion.

* * * * *